Figure 1:
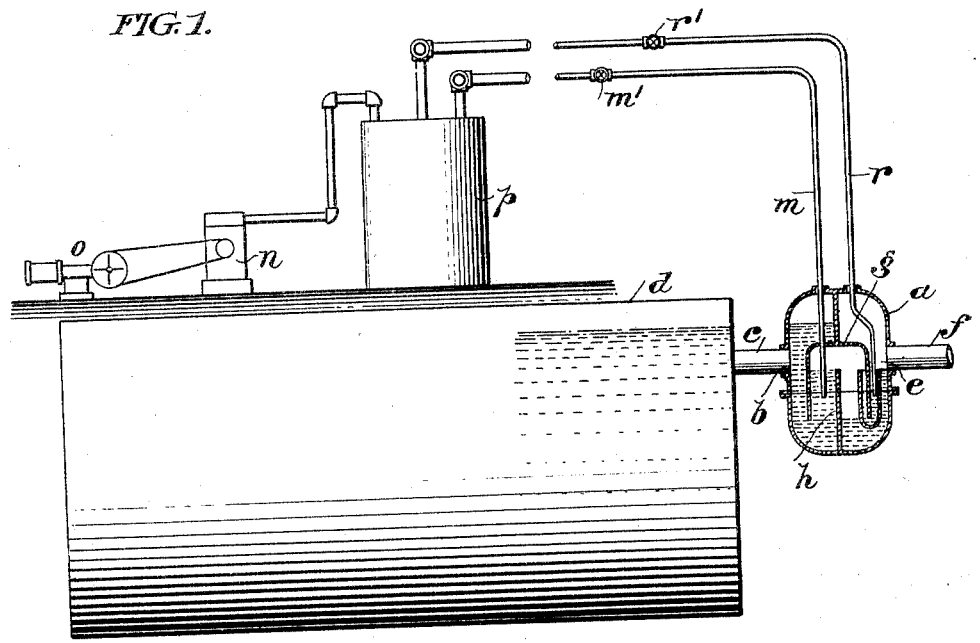

No. 775,855. PATENTED NOV. 22, 1904.
A. PRIESTMAN.
VALVE MECHANISM FOR CONTROLLING FLOW OF LIQUIDS.
APPLICATION FILED FEB. 5, 1904.
NO MODEL.

No. 775,855. Patented November 22, 1904.

UNITED STATES PATENT OFFICE.

ALBERT PRIESTMAN, OF PHILADELPHIA, PENNSYLVANIA.

VALVE MECHANISM FOR CONTROLLING FLOW OF LIQUIDS.

SPECIFICATION forming part of Letters Patent No. 775,855, dated November 22, 1904.

Application filed February 5, 1904. Serial No. 192,086. (No model.)

*To all whom it may concern:*

Be it known that I, ALBERT PRIESTMAN, of the city and county of Philadelphia, State of Pennsylvania, have invented an Improvement in Valve Mechanism for Controlling the Flow of Liquids, of which the following is a specification.

Heretofore valves for controlling the flow of liquids have been constructed of metal, wood, or other solid substances, with a moving part acting to close an aperture or passage-way.

Such valves must be carefully fitted to effect a liquid-tight seating of the movable part on the seat about the aperture or passage-way and are subject to wear and corrosion and rendered leaky by the lodgment of solid matter between the movable part and the seat, which prevents the tight closure of the valve.

It is the object of my invention to obviate these difficulties by dispensing entirely with the movable piece and its solid seat and effecting the closure of the liquid passage-way by a body of air or gas forced by mechanical means into the passage-way and forming an air column held in place by and supporting a column of liquid on the discharge or outlet side. Owing to the difference in the densities of the air or gas and the liquid, this liquid column will not only hold the body of air in place, but will also support a liquid column on the inlet side above the inlet of a height approximately equal to its own height. It follows, therefore, that this body of air in the liquid passage-way will operate as a valve to prevent the flow of liquid when the pressure at the inlet is less than the pressure of the liquid column on the outlet side. To effect this result, it is necessary to force into the liquid passage-way a sufficient volume of air to displace and form on the outlet side a liquid column of sufficient height to overcome the pressure at the inlet, and this is obtained by positively forcing the air by a compressor, pump, or other mechanical device by which the requisite air-pressure may be obtained.

To open the valve, it is only necessary to relieve the air-pressure in the liquid passage-way, when the back pressure of the sustained column of liquid on the discharge side is destroyed and the liquid may flow through the passage-way under the pressure of the inlet.

I am aware that air-locks have been used heretofore in which the pressure of the outgoing liquid has been utilized to force air through an air-pipe into a ∩-shaped pipe to air-bind and prevent the flow of liquid through said pipe when the outgoing liquid had reached a given level, and I do not mean to claim such devices. My invention differs, essentially, from devices of this kind in that the closing of the valve to the passage of the liquid is positively and directly controlled by mechanical means and is entirely independent of the level of the outflowing liquid. It is simply a valve for controlling the flow of liquids, which may be closed at will by the person in charge irrespective of what becomes of the discharged liquid and is intended for purposes to which the devices referred to are neither adapted nor intended.

My valve mechanism is illustrated in the accompanying drawings, in which—

Figure 2:
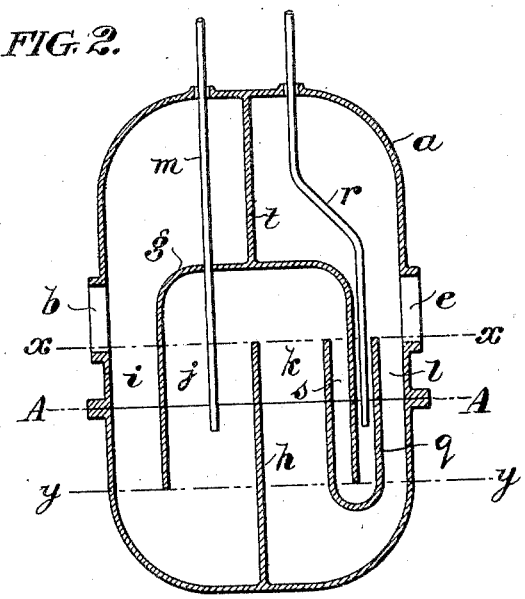
Figure 3:
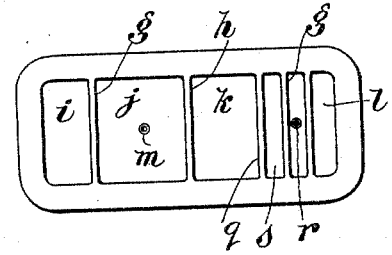

Figure 1 is a side elevation of the valve mechanism applied to controlling the flow of liquid from a tank or reservoir, the valve proper being shown in vertical section. Fig. 2 is a vertical section of the valve, on an enlarged scale; and Fig. 3 is a horizontal section on the line A A of Fig. 2.

The valve-body $a$ is provided on one side with an inlet $b$, connected with the supply-pipe $c$ from the tank or reservoir $d$, from which the flow of liquid is to be controlled, and on the other side with an outlet $e$, which may communicate with a suitable discharge-pipe $f$.

Within the valve-body $a$ is a liquid passage-way which, as shown, is formed as follows:

A ∩-shaped wall or partition $g$ is arranged within the valve-body having its lower edges at a distance from the bottom. A partition $h$ extends from the bottom of the valve-body part way up into the space between the side walls of the partition $g$. These partitions $g$ and $h$ form a serpentine passage-way $i\,j\,k\,l$ through the valve-body between the inlet and outlet, through which the liquid must pass in traversing the valve. If desired, this air-tight liquid passage-way may be formed of an ∩-shaped pipe.

$m$ is a pipe projecting through the walls of the partition $g$, by which air or gas may be forced into the liquid passage-way bounded by the walls of said partition. The pipe is shown projecting downward a distance into the space $j$ between the walls $g$ and $h$; but this is not necessary, though it is in some cases desirable. It will usually be sufficient if the pipe $m$ opens through the top of the partition $g$.

Supposing the valve to be attached to a reservoir, such as $d$, having a liquid level above the outlet $e$, the liquid will flow under hydrostatic pressure through the serpentine passage-way $i\ j\ k\ l$ to the outlet $e$.

If it is desired to stop the flow, air is forced through the pipe $m$ into the liquid passage-way under the partition $g$, and, being of less density than the liquid, it will accumulate within the partition $g$ until it displaces and ejects through the passage-ways $k\ l$ an approximately equal volume of liquid. There will then be a column of compressed air within the upper portion of the partition $g$ above the level $x\ x$ and in the space $k$ between the walls $h$ and $g$, which will support a column of liquid on the inlet side above the level $x\ x$ approximately equal to the column between the levels $x\ x$ and $y\ y$. The liquid column in the space $j$ will balance the equal column in the space $i$ up to the level $xx$. As the air column in the space $k$ is of much less density than the liquid column in the space $l$, the latter column will hold the air column in $k$ in place and will also counterbalance and hold back a column of liquid above the level $x\ x$ approximately equal to its own height.

The column of compressed air or gas thus supported by the liquid column $l$ forms a positive and effective valve for closing the passage-way through $i\ j\ k\ l$ to the flow of liquid in any case where the level to be maintained in the reservoir or apparatus connected with the inlet or the pressure at the inlet does not exceed the height of the column $l$ or its pressure.

Any suitable mechanical means may be used for forcing the air into the liquid passage-way. For purposes of illustration I have shown an air-pump $n$, driven by an engine $o$, and supplying air to a storage-tank $p$, connected with the air-pipe $m$. The air-pipe $m$ may be provided with a valve $m'$, which if constructed as a three-way valve with a relief-port may be used to relieve the air-pressure in the valve $a$ and open the passage-way $i\ j\ k\ l$ to the flow of liquid.

It is obvious that the valve may be opened to the flow of liquid by relieving the air-pressure within the chamber formed by the partition $g$ in any convenient manner. While this may be effected by means of the valve $m'$, I prefer to employ for this purpose the pressure-relief device shown in Figs. 1 and 2.

$q$ is a U-shaped tube or partition into which extends the wall of the partition $g$ on the outlet side, forming therewith a U-shaped water seal $s$, into which projects an air or gas pipe $r$, which may, if desired, lead from the storage-tank $p$ and be provided with a suitable valve $r'$. When the valve $a$ is closed by the column of compressed air in the space $k$, the water seal $s$ on the side communicating with the passage-way $l$ will be filled with water to the level $x\ x$, and if air is forced through the pipe $r$ it will force the water out of the water seal $s$ toward the outlet $e$, the pressure on that side being the least, and will thus relieve the air-pressure within the partition $g$ and space $k$, so that the liquid may flow through the serpentine passage-way $i\ j\ k\ l$ to the outlet $e$.

In the upper part of the valve-body $a$ may be arranged a partition $t$ to prevent liquid passing over the top of the partition $g$ to the outlet $e$. The valve-body should be open to the atmosphere at the top to prevent air-pressure on the column of liquid in $l$.

The construction of the valve may be greatly varied without departing from the invention. It is only necessary that there should be an ∩-shaped liquid passage-way having one leg communicating with the inlet and the other leg with an outlet so located that a liquid column can be formed by the injected air between the outlet-leg of the liquid passage-way and the level of the outlet. The length of legs of the ∩-shaped liquid passage-way and the level of the outlet will therefore depend upon the hydrostatic head or pressure to be sustained at the inlet when the valve is closed.

It will be noted that no devices are necessary to regulate the air-pressure through the pipe $m$, since any excess of pressure will merely have the effect of forcing the excess of air out through the liquid column $l$ without decreasing that column or opening the valve.

What I claim as new, and desire to secure by Letters Patent, is as follows:

1. A valve mechanism consisting of an air-tight ∩-shaped liquid passage-way communicating at each end with a liquid column, and means controlled at will to force air or gas into said passage-way to displace a column of liquid on the outlet side of said ∩-shaped passage-way, and thereby enable a column of liquid, approximately equal to the displaced column, to be supported on the inlet side above the normal level of the column of liquid on the inlet-leg of said ∩-shaped passage-way.

2. A valve mechanism consisting of an air-tight ∩-shaped liquid passage-way communicating at each end with a liquid column, means controlled at will to force air or gas into said passage-way to displace a column of liquid on the outlet side of said ∩-shaped passage-way and thereby enable a column of liquid, approximately equal to the displaced column, to be supported on the inlet side above the normal level of the column of liquid on the inlet side of said ∩-shaped passage-way, and means to relieve the air-pressure in said ∩-shaped passage-way to unseal it and permit the liquid to flow.

3. A valve mechanism consisting of an air-tight ∩-shaped liquid passage-way communicating at each end with a liquid column, a pipe opening into the interior of said liquid passage-way, and means controlled at will to force air or gas through said pipe into said ∩-shaped passage-way, substantially as and for the purposes described.

4. A valve mechanism for controlling the flow of liquids, consisting of an air-tight ∩-shaped liquid passage-way communicating at each end with a liquid column, a storage-tank to contain air or gas under pressure, a supply-pipe leading from said storage-tank to said liquid passage-way, and an air-pump to force air into said storage-tank.

5. A valve mechanism for controlling the flow of liquids, consisting of an air-tight ∩-shaped liquid passage-way communicating at each end with a liquid column, a storage-tank to contain air or gas under pressure, a supply-pipe leading from said storage-tank to said liquid passage-way, an air-pump to force air into said storage-tank, and means to relieve the air-pressure in said ∩-shaped passage-way.

6. A valve device for controlling the flow of liquids, consisting of a valve-body having an inlet and an outlet, a ∩-shaped liquid passage-way in said valve-body communicating at each end with a liquid column, a pipe opening into said ∩-shaped liquid passage-way, and means controlled at will to force air or gas under pressure through said pipe into said ∩-shaped liquid passage-way, substantially as and for the purposes described.

7. A valve device for controlling the flow of liquids consisting of a valve-body having an inlet on one side and an outlet on the other, the internal ∩-shaped partition $g$ and the upright partition $h$, forming together and with the walls of the valve-body a serpentine liquid passage-way $i\ j\ k\ l$, an air-pipe opening through said partition $g$, and means controlled at will to force air or gas through said air-pipe into the central portion of said serpentine passage-way.

8. A valve device for controlling the flow of liquids, consisting of a valve-body having an inlet on one side and an outlet on the other, the internal ∩-shaped partition $g$ and the upright partition $h$, forming together and with the walls of the valve-body a serpentine liquid passage-way $i\ j\ k\ l$, an air-pipe opening through said partition $g$, means controlled at will to force air or gas through said air-pipe into the central portion of said serpentine passage-way, and means to relieve the air-pressure under said partition.

9. A valve device for controlling the flow of liquids, consisting of a valve-body having an inlet on one side and an outlet on the other, the internal ∩-shaped partition $g$ and the upright partition $h$, forming together and with the walls of the valve-body, a serpentine liquid passage-way $i\ j\ k\ l$, an air-pipe opening through said partition $g$, means controlled at will to force air or gas through said air-pipe into the central portion of said serpentine passage-way, consisting of a water seal $s$ between said passage-ways $k\ l$, and an air force-pipe $r$ projecting into said water seal.

10. A valve device for controlling the flow of liquids, consisting of a vertically-arranged serpentine water-conduit communicating at one end with the inlet and at the other end with the outlet, an air-pipe opening into the central portion of said serpentine conduit, and means controlled at will to force air or gas through said pipe into the central bends of said serpentine conduit.

In testimony of which invention I hereunto set my hand.

ALBERT PRIESTMAN.

Witnesses:
ERNEST HOWARD HUNTER,
R. M. KELLY.